(12) United States Patent
Chen et al.

(10) Patent No.: US 9,979,668 B2
(45) Date of Patent: May 22, 2018

(54) COMBINED GUARANTEED THROUGHPUT AND BEST EFFORT NETWORK-ON-CHIP

(71) Applicant: Intel Corporation, Santa Clara, CA (US)

(72) Inventors: Gregory K. Chen, Portland, OR (US); Mark A. Anders, Hillsboro, OR (US); Himanshu Kaul, Portland, OR (US); Ram K. Krishnamurthy, Portland, OR (US); Aaron T. Stillmaker, West Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 14/579,303

(22) Filed: Dec. 22, 2014

(65) Prior Publication Data
US 2016/0182393 A1    Jun. 23, 2016

(51) Int. Cl.
*H04L 12/863* (2013.01)
*H04L 12/911* (2013.01)
*H04L 12/935* (2013.01)
*G06F 15/78* (2006.01)

(52) U.S. Cl.
CPC ........ *H04L 47/625* (2013.01); *G06F 15/7825* (2013.01); *H04L 47/72* (2013.01); *H04L 49/30* (2013.01)

(58) Field of Classification Search
CPC ..... H04L 45/40; H04L 47/24; H04L 47/2408; H04L 47/50–47/524; H04L 49/109; H04L 49/205; H04L 49/253; H04L 49/254; G06F 15/78; G06F 15/7807; G06F 15/7814; G06F 15/7825
See application file for complete search history.

(56) References Cited

U.S. PATENT DOCUMENTS

| | | | |
|---|---|---|---|
| 8,284,766 B2 | 10/2012 | Anders et al. | |
| 8,671,220 B1 | 3/2014 | Garg et al. | |
| 2008/0205432 A1* | 8/2008 | Gangwal | H04L 45/40 370/458 |
| 2009/0300292 A1 | 12/2009 | Fang et al. | |
| 2011/0134933 A1 | 6/2011 | Eberle et al. | |

(Continued)

FOREIGN PATENT DOCUMENTS

| | | |
|---|---|---|
| EP | 2343656 A1 | 7/2011 |
| WO | WO 2014/209391 | 12/2014 |

OTHER PUBLICATIONS

Anders, et al., "A 2.9Tb/s 8W 64-Core Circuit-Switched Network-on-Chip in 45 nm CMOS," IEEE, 2008, 978-1-4244-2362-0/08 (pp. 182-185).

(Continued)

*Primary Examiner* — Pao Sinkantarakorn
(74) *Attorney, Agent, or Firm* — Alliance IP, LLC

(57) ABSTRACT

A first packet-switched reservation request is received. Data associated with the first packet-switched reservation request is communicated through a first circuit-switched channel according to a best effort communication scheme. A second packet-switched reservation request is received. Data associated with the second packet-switched reservation request is communicated through a second circuit-switched channel according to a guaranteed throughput communication scheme.

19 Claims, 10 Drawing Sheets

(56) References Cited

U.S. PATENT DOCUMENTS

| | | |
|---|---|---|
| 2015/0071282 A1 | 3/2015 | Anders et al. |
| 2015/0188829 A1 | 7/2015 | Satpathy et al. |

OTHER PUBLICATIONS

Anders et al., "A 4.1Tb/s Bisection-Bandwidth 560Gb/s/W Streaming Circuit-Switched 8×8 Mesh Network-on-Chip in 45nm CMOS," ISSCC 2010, Session 5, Processors, 5.8, Intel Corporation, IEEE International Solid-State Circuits Conference, Feb. 8, 2010, IEEE Digest of Papers, 978-1-4244-6034-2, (pp. 110-112).

Chen et al., "A 340mV-to-0.9V 20.2Tb/s Source-Synchronous Hybrid Packet/Circuit-Switched 16×16 Network-on-chip in 22nm Tri-Gate, CMOS," ISSCC 2014, Session 16/SoC Building Blocks 16.1, Intel Corporation, 2014 IEEE International Solid-State Circuits Conference, Feb. 11, 2014, IEEE Digest of Technical Papers, 978-1-4244-6034-2 (pp. 276-278).

Park et al., "A 1.2TB/s On-Chip Ring Interconnect for 45nm 8-Core Enterprise Xenon® Processor," ISSCC 2010, Session 9, Digital Circuits & Sensors, 9.4, Intel Corporation, 2010 IEEE International Solid-State Circuits Conference, ISSCC 2010, Feb. 9, 2010, IEEE Digest of Technical Papers, 978-1-4244-6034-2/10 (pp. 180-182).

Cohen et al, "Statistical Approach to Networks-on-Chip," Computers, IEEE Transactions, vol. 59, Issue 6, Feb. 18, 2010, ISSN 0018-9340 (pp. 748-761).

Hanson et al., "aelite: A Flit-Synchronous Network on Chip with Composable and Predictable Services," Design, Automation & Test in Europe Conference & Exhibition, pp. 250-255, Apr. 2009.

PCT International Preliminary Report on Patentability ("IPRP") for PCT/US2015/062244 dated Jul. 6, 2017, 9 pages.

International Search Report and Written Opinion in International Application No. PCT/US2015/062244, dated Mar. 2016.

Praveen Vellanki et al., "Quality-of-service and error control techniques for network-on-chip architectures," In Proceedings of the 14th ACM Great Lakes symposium on VLSI, ACM, Apr. 26-28, 2004, pp. 45-50.

\* cited by examiner

US 9,979,668 B2

COMBINED GUARANTEED THROUGHPUT AND BEST EFFORT NETWORK-ON-CHIP

STATEMENT OF GOVERNMENT INTEREST

This invention was made with Government support under contract number 6600738 awarded by the Department of Energy. The Government has certain rights in this invention.

FIELD

The present disclosure relates in general to the field of computer development, and more specifically, to a combined guaranteed throughput and best effort network-on-chip (NoC).

BACKGROUND

Networks-on-Chip (NoCs), for on-die communication between cores, are important in enabling scalable performance as the number of cores and intellectual property (IP) blocks increases in multi-core processors. In such instances, communication between components becomes the key power and performance limiter. NoCs enable efficient sharing of on-chip wiring resources for communication with routers to control and arbitrate the flow of data between communicating components. Hybrid packet/circuit-switched NoCs enable high throughput and utilization of packet-switching with energy efficiency approaching circuit-switched data propagation.

On-chip interconnect is a key performance and power limiter for applications running on NoCs. Many applications such as media streaming and on-line gaming require limits on latency and a guaranteed minimum throughput to achieve high quality of service. NoCs should deliver these performance requirements with low area and energy overheads.

BRIEF DESCRIPTION OF THE DRAWINGS

Like reference numbers and designations in the various drawings indicate like elements.

DETAILED DESCRIPTION

Figure 1:
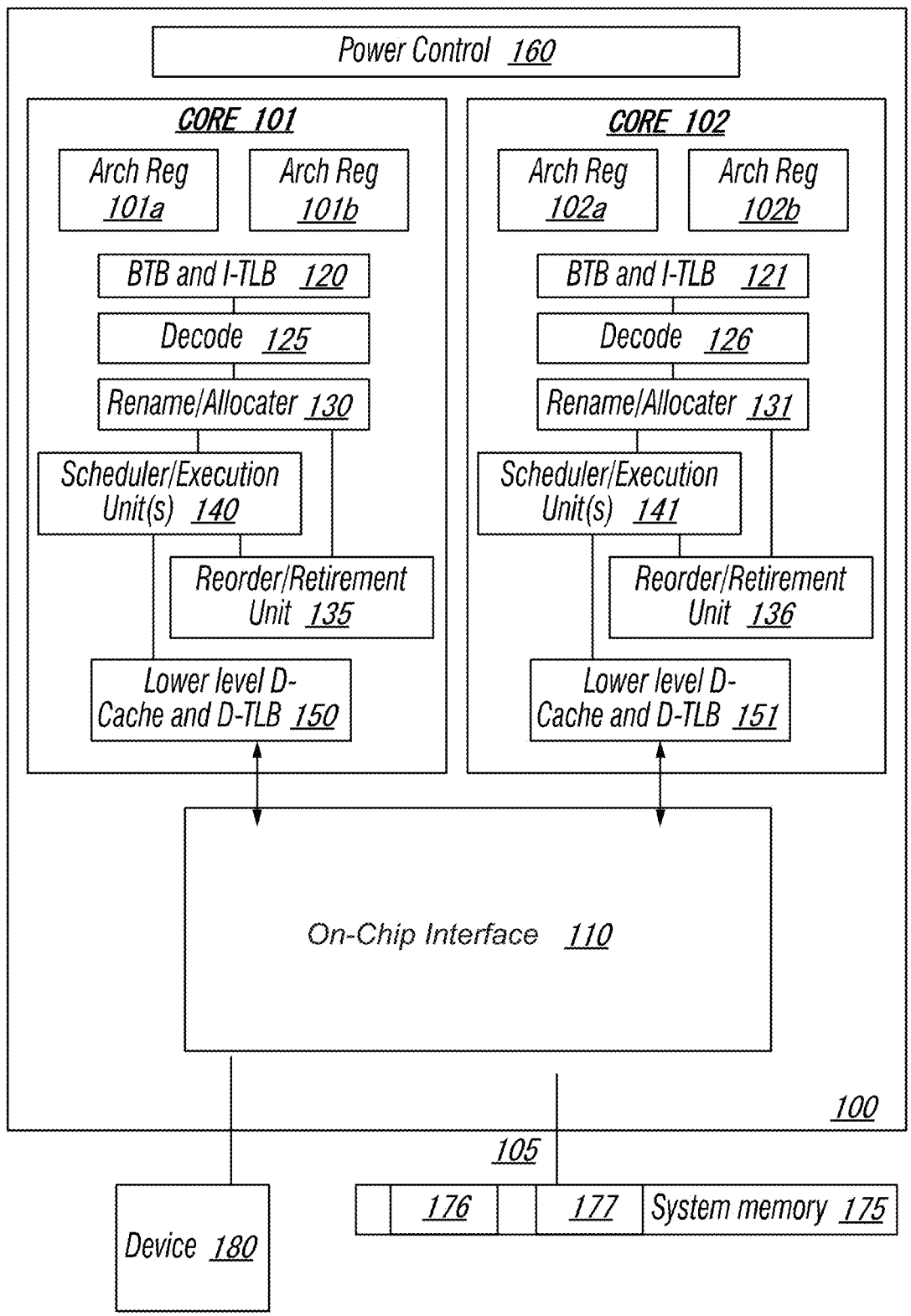
FIG. 1 illustrates a block diagram for an example computing system including a multicore processor in accordance with certain embodiments.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, but may also be used in other devices, such as server computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
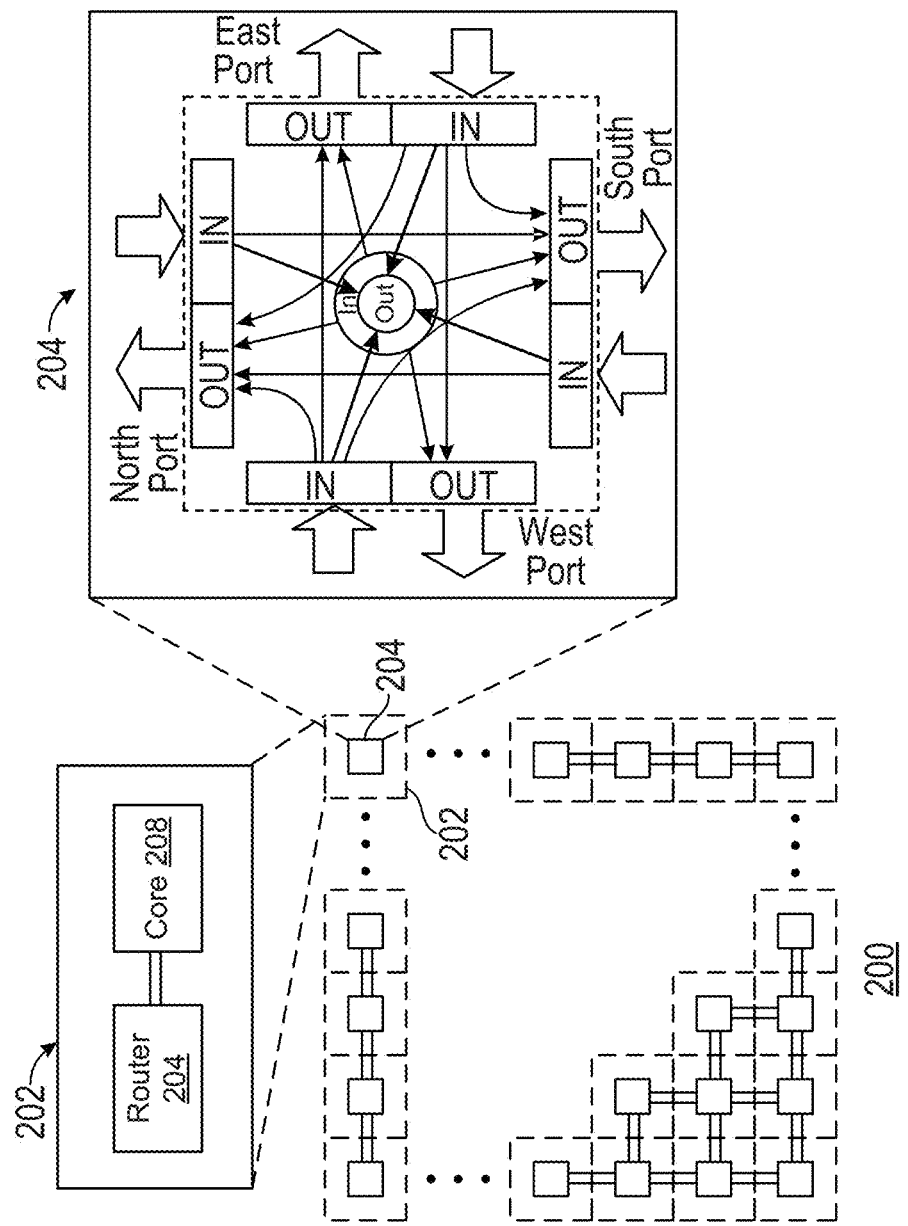
FIG. 2 illustrates a block diagram of a processor comprising a network on a chip (NoC) system including a plurality of routers in accordance with certain embodiments.

FIG. 2 illustrates a block diagram of a processor 200 comprising an NoC system including a plurality of routers 204 in accordance with certain embodiments. The processor 200 may include any processor or processing device, such as a microprocessor, an embedded processor, a digital signal processor (DSP), a network processor, a handheld processor, an application processor, a co-processor, an SoC, or other device to execute code. In particular embodiments, processor 200 is implemented on a single die.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. Each network element 202 includes a router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 may be communicatively coupled to its own core 208 (or other logic block). As used herein, a reference to a core may also apply to other embodiments where a different logic block is used in place of a core. For example, various logic blocks may comprise a hardware accelerator (e.g., a graphics accelerator, multimedia accelerator, or video encode/decode accelerator), I/O block, memory controller, or other suitable fixed function logic. The processor 200 may include any number of processing elements that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet switched network. That is, the packet switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. The packet switched network may include buffering because a dedicated path is not assured from a source to a destination and so a packet may need to be stopped temporarily if two or more packets need to traverse the same link or interconnect. As an example, the packets may be buffered (e.g., by flip flops) at each of the respective routers as the packet travels from a source to a destination.

The packets may be received, transmitted and processed by the routers 204. The packet switched network may use point-to-point communication between neighboring routers. The control portions of the packets may be transferred between routers based on a packet clock having any suitable frequency, such as a 4 GHz clock. The data portion of the packets may be transferred between routers based on a similar clock, such as a 4 GHz clock.

In an embodiment, routers of processor 200 may be variously provided in two networks or communicate in two networks, such as a packet switched network and a circuit-switched network. Such a communication approach may be termed a hybrid packet/circuit-switched network. In such embodiments, packets may be variously communicated among the various routers 204 using resources of the packet switched network and the circuit-switched network. In order to transmit a single data packet, the circuit-switched network may allocate an entire path, whereas the packet switched network may allocate only a single segment (or interconnect). In some embodiments, the packet switched network may be utilized to reserve resources of the circuit-switched network for transmission of data between routers 204.

Router 204 may include a plurality of port sets to variously couple to and communicate with adjoining network elements 202. For example, circuit-switched and packet switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X first, Y second routing wherein data moves first in the East/West direction and then in the North/South direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as processor logic of a "local" core 208. Herein, this port set will be referred to as a "core port set," though it may interface with logic other than a core in some implementations. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

Figure 3:
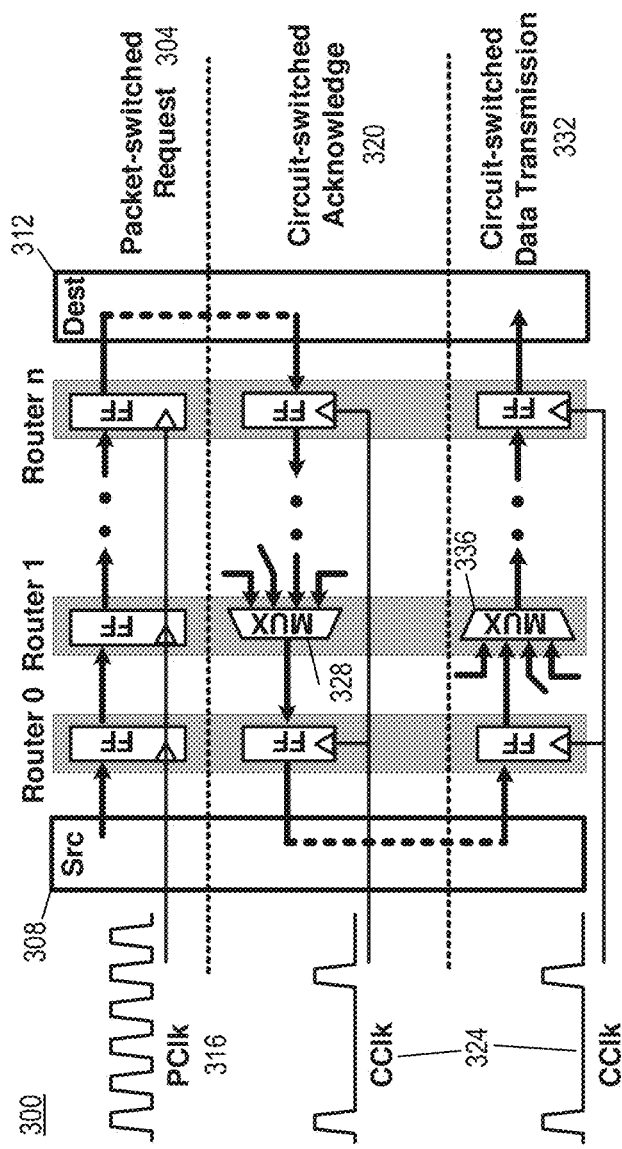
FIG. 3 illustrates example communications in an example system for a synchronous hybrid packet/circuit-switched NoC in accordance with certain embodiments.

FIG. 3 illustrates example communications in an example system 300 for a synchronous hybrid packet/circuit-switched NoC in accordance with certain embodiments. A synchronous NoC may utilize explicit clocks and level sensitive control signals. A synchronous packet-switched NoC may comprise routers that communicate with their neighbors based on a global clock. Thus, all the routers in a synchronous NoC operate at the same frequency. The communications depicted may be performed in an NoC of a processor, such as processor 200. Each router depicted may have any suitable characteristics described herein with respect to routers 204.

In an embodiment, the communications include an exchange of a packet-switched reservation request 304 to configure the circuit-switched pathway. Source logic 308 (e.g., a core 208) may send the reservation request to destination logic 312 (e.g., a different core 208). Reservation request 304 may travel through n+1 routers on its way to the destination and the reservation request 304 is flopped at each router. The reservation request 304 may be transferred between routers based on a packet clock 316, such as a 2 GHz clock or a 4 GHz clock. The request packet 304 may be communicated via a packet-switched portion of the NoC and may reserve resources for data communication between source logic 308 and destination logic 312 as the request packet travels from the source to the destination. The request packet 304 may include any suitable information facilitating the reservation of a circuit-switched channel. As an example, the request packet may include an address associated with the destination logic. The request packet is forwarded downstream based on the destination address when resources are available. For example, based on a deterministic routing method (e.g., X-first, Y-second routing or a table lookup) or other routing protocol performed by a direction decoder in the given router, the request packet is forwarded along on a path from the source logic 308 to the destination logic 312. In an embodiment, a unique address may be associated with each core 208 or other logic block (and thus router 204 in cases where there is a 1:1 mapping between cores and routers). In turn, this local address may be used to generate direction information local to each router to identify the appropriate port of the router for sending the information. Thus, the destination address may be used in conjunction with the local address of the router 204 to determine which direction to forward an incoming packet.

After the request packet 304 reaches the destination logic 312, a circuit-switched acknowledge signal 320 is sent from the destination logic 312 to the source logic 308. Although not shown, in various embodiments (such as those utilizing queue slots to store information associated with reservation requests), an acknowledge signal may also be sent from the source logic 308 to the destination logic 312 at the same time the acknowledge signal 320 is sent from the destination logic 312 to the source logic 308. The acknowledge signal 320 confirms configuration of the circuit-switched path reserved by the reservation request 304. In various embodiments, when each router receives an acknowledge signal from the source and the destination, that router knows that the path is ready for circuit-switched data transmission. The acknowledge signal 320 is flopped at the router (router n) coupled to the destination logic 312 and then again at the router (router 0) coupled to the source logic 308, but is otherwise passed through the various routers of the network without being stored. As depicted in router 1, the acknowledge signal 320 may pass through multiplexing logic 328 at each router in between router n and router 0. The multiplexing logic 328 at each router is configured based on direction information generated in response to the reservation request 304. Multiplexing logic 328 may act to couple an input port of a router to the correct output port of the router to allow the acknowledge signal 320 to travel the correct path from destination logic 312 to source logic 308.

The acknowledge signal 320 is clocked by circuit clock 324. To improve data throughput, different clocks may be used to synchronize the packet-switched and circuit-switched portions of the network. A packet-switched request may travel between neighboring routers for each cycle of packet clock 316, whereas circuit-switched data may travel across the whole network in a single cycle of circuit clock 324. Accordingly, a packet-switched portion of a network may operate with a higher frequency clock than a circuit-switched portion of the network. In a particular embodiment, packet clock 316 operates at a frequency of 2 GHz, while circuit clock 324 operates at a frequency of 500 MHz, though any suitable frequencies may be used for these clocks. For example, in another embodiment, packet clock 316 operates at a frequency of 4 GHz, while circuit clock 324 operates at a frequency of 1 GHz.

After the acknowledge signal 320 is received by the source logic 308, circuit-switched data 332 is sent from the source logic 308 to the destination logic 312. The data 332 is flopped at the router (router 0) coupled to the source logic 308 and then again at the router (router n) coupled to the destination logic 312, but is otherwise passed through the various routers of the network without being stored. As depicted in router 1, the data 332 may pass through multiplexing logic 336 at each router in between router 0 and router n. The multiplexing logic 336 at each router is configured based on direction information generated in response to the reservation request 304. Multiplexing logic 336 may act to couple an input port of a router to the correct output port of the router to allow the data 332 to travel the correct path from source logic 308 to destination logic 312. The transmission of data 332 is clocked by circuit clock 324.

In various embodiments, a circuit-switched data transmission may be taking place concurrently with an exchange of acknowledges for one or more future transmissions and/or concurrently with an exchange of one or more packet-switched requests for circuit-switched paths to be configured. Accordingly, a router participating in the circuit-switched exchanges may prepare for future circuit-switched path configurations by determining and storing the routing direction for a future data transmission.

Figure 4:
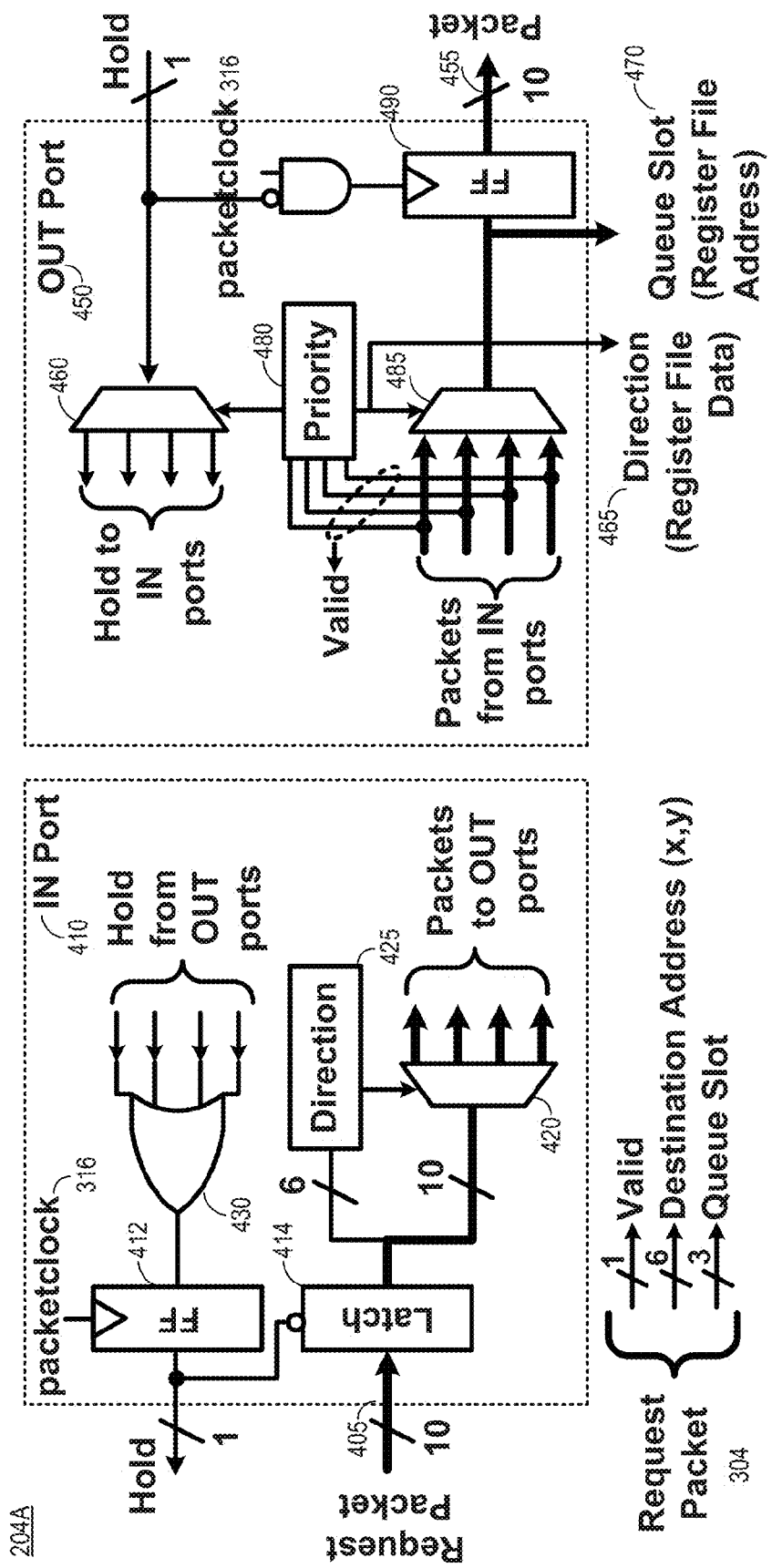
FIG. 4 illustrates a block diagram illustrating an example input (IN) port and output (OUT) port of a router using sequential address decode and packet arbitration in accordance with certain embodiments.

FIG. 4 illustrates a block diagram illustrating an example IN port 410 and OUT port 450 of a router 204A using sequential address decode and packet arbitration in accordance with certain embodiments. Router 204A may have any suitable characteristics described above with respect to router 204. Although only a single IN port and single OUT port is depicted, router 204A may have any suitable number of port sets. In the description below, router 204A will be assumed to have five port sets (including one port set for a core).

In an embodiment, router 204A includes an IN port 410 comprising a portion to receive packet-switched communications sent to router 204A and an OUT port 450 comprising a portion to send packet-switched information from router 204A. IN port 410 and OUT port 450 may further comprise respective other portions (not shown) to exchange circuit switched information. For example, circuit-switched routing portions of the ports may include configuration logic to configure at least part of a respective circuit-switched path. In various embodiments, such configuration is performed in advance of router 204A receiving data to be communicated along that circuit-switched path.

IN port 410 may include various components facilitating packet routing, such as, among other possible components, flip flop 412, a latch set 414, demultiplexer logic 420, direction logic 425, and OR gate 430. IN port 410 receives a request packet 304 from a core or another router via input 405. Packet 304 may include any suitable information. As described above, the request packet may include an address associated with the destination logic. For example, in the embodiment depicted, the packet 304 includes a six-bit destination address. As one example, the destination address may include a three-bit address value indicating a location along an x-axis of a grid of the network and another three-bit address value indicating a location along a y-axis of the grid.

The request packet may also include a valid bit and a three-bit (or other suitable size) queue slot. The valid bit may indicate whether the packet 304 is valid. For example, when a new packet arrives, the valid bit may be asserted. After the packet has been forwarded by the appropriate OUT port the valid bit may be deasserted so that the packet (which may still be stored by latch 414) is not forwarded again erroneously and the OUT port may forward the next valid packet.

The queue slot bits may indicate a location in a register file where information about the packet (e.g., a direction associated with the packet) is to be stored. In the embodiment depicted, the register file may have eight locations and so the queue slot is identified by three bits, though any suitable sizes may be used. In other embodiments, packet 304 may also include one or more sideband enable bits that indicate whether packet 304 includes data to be sent as part of a sideband communication. Packet 304 may also include bits to carry the sideband data. Thus, although packet 304 is shown as having ten bits, packet 304 may have any suitable number of bits.

A packet 304 enters the input and passes through latch 414 when the latch is not closed by a hold signal from flip flop 412. The packet is passed to demultiplexer logic 420. Demultiplexer logic 420 is operable to demultiplex the packet to any of a plurality of OUT ports of router 204A. In some embodiments, the number of signal sets exiting the demultiplexer is equal to the number of OUT ports minus one (since a packet that came through an IN port of a port set would not be sent to the OUT port of that port set). The output of demultiplexer logic 420 is set by direction logic 425, which functions as an address decoder. Direction logic 425 is suitable to determine a direction to be associated with packet 304 based on information in the packet (e.g., the destination address) and/or other suitable information (such as the address of router 204A). This direction may indicate which OUT port of router 204A the packet 304 should be routed to. For example, direction logic 425 may evaluate the destination address of the packet 304 and the address of router 204A, determine a path of demultiplexer logic 420 for directing packet 304 to the correct OUT port, and then select that path such that packet 304 is forwarded to the correct OUT port while the other paths from demultiplexer logic 420 remain unasserted.

As depicted IN port may also include paths to receive hold signals. For example, the IN port may include one path to each OUT port of the other port sets to receive a hold signal from the respective port. The hold signals provide flow control. When a hold signal is received from any of the OUT ports, the output of OR gate 430 is asserted and this value is flopped on the next cycle of packetclock 316. This closes the latch from accepting additional packets 304 until the hold signal is cleared. This signal will be explained further below in connection with the OUT port.

OUT port 450 may include various components facilitating packet routing, such as, among other possible components, hold demultiplexer logic 460, priority logic 480, multiplexer logic 485, and flip flops 490. OUT port 450 receives a plurality of inputs (each operable to transport a packet 304 from a respective input port of router 204A). Multiplexer logic 485 is operable to multiplex the inputs into a single output that is provided to output 455 through flip flops 490. In the embodiment depicted, in a cycle of the packetclock 316, multiplexer logic 485 may receive anywhere from one to four different packets (each packet received from a different input port of router 204A) and select one packet to be passed through to the output 455 of OUT port 450.

Priority logic 480 functions as a packet arbitrator by selecting one of the valid packets (e.g., a packet having a valid bit that is asserted) from the IN ports (e.g., using a round-robin technique) and sends hold signals to the unselected IN ports via hold demultiplexer logic 460. Priority logic 480 sends a signal representing the selected packet to multiplexer logic 485, enabling multiplexer logic 485 to pass the selected packet to flip flops 490. The packet is flopped based on packetclock 316 when the hold signal received by the OUT port is not asserted.

Priority logic 480 also sends direction data 465 associated with the selected packet to a register file. The direction data may specify which direction the packet 304 came from. For example, the direction data 465 may be an indication of the IN port from which the packet 304 was received. In particular embodiments, the direction data may be represented by a two-bit value, thus being able to identify any one of the four ports from which packets are received. The queue slot bits 470 of the selected packet are also passed to the register file and are used as an address to store the direction data 465 in the location of the register file specified by the queue slot bits 470. If the queue slot requested by the packet 304 is already full, the priority logic may assert a hold signal, thus preventing the packet from continuing. In an embodiment, the writing of the direction data 465 may be selectively prevented or modified when priority logic 480 determines that packet 304 is solely for communication of sideband data (that is, is not meant to setup a circuit-switched channel). In such an embodiment, the providing of output 470 may also be selectively prevented or otherwise altered.

The direction data written into the register file is used to facilitate the setup of the circuit-switched path. Each port in each router may include a similar register file. When the appropriate time for establishing the circuit-switched channel has arrived, a queue slot of each of the various ports that includes direction information associated with the circuit-switched channel may be selected (in various embodiments it may be the same queue slot in each of the ports) and the direction information used to configure multiplexers and demultiplexers in the routers from the source to the destination. Upon completion of data transfer through the circuit-switched channel, different queue slots in the register files are selected to set up further circuit-switched channels.

In various embodiments of the present disclosure, the queue slots of the register files may facilitate an NoC that performs combined guaranteed throughput and best effort (GT+BE) data transmissions. Typical NoCs deliver best effort (BE) traffic based on network resource availability with no throughput or latency guarantees. However, many applications such as media streaming and on-line gaming require limits on latency and a guaranteed minimum throughput to achieve high quality of service.

An NoC can provide guaranteed throughput (GT) by reserving bandwidth for a specific transfer. This eliminates conflicts for that transfer and delivers a minimum guaranteed throughput as well as guaranteed low latency. However, reserving NoC resources prevents other traffic from using those resources, leading to low network utilization and reduced total throughput. Another approach is to overprovision BE NoCs to meet performance requirements. BE flow-control sends transfers based on network resource availability and has a simple hardware implementation. However, BE networks do not have latency and throughput guarantees. Over-provisioning provides enough bandwidth for the near-worst-case scenario, with network resources wasted for lighter traffic. Conversely, designing for the average case causes unacceptable worst-case latency with adversarial traffic.

Various embodiments of the present disclosure provide a combined GT+BE NoC. The GT+BE data transfers are performed on a hybrid packet/circuit-switched NoC. Requests are packet-switched and stored for one or more cycles at each router as they are relayed through the network. Data are circuit-switched by reserving a complete channel from source to destination with no intra-route data storage. The GT+BE NoC reserves bandwidth on time-multiplexed circuit-switched channels to provide GT on the energy-efficient channel with a fixed, low latency through the NoC. A distributed algorithm resolves collisions in GT resources by retrying conflicting transfers in different time slots. The NoC supports BE traffic for non-latency-critical transfers to make better utilization of network resources and increase total throughput. By combining GT and BE traffic on one NoC, latency-sensitive applications can receive GT, while less-critical tasks can use BE transfers to use unreserved and idly reserved resources. This improves the quality of service for latency-sensitive and real-time applications such as on-line gaming and media streaming. Moreover the circuit-switched technique improves energy-efficiency through intra-route data storage removal and elimination of recurring channel setup and de-allocation costs.

Figure 5:
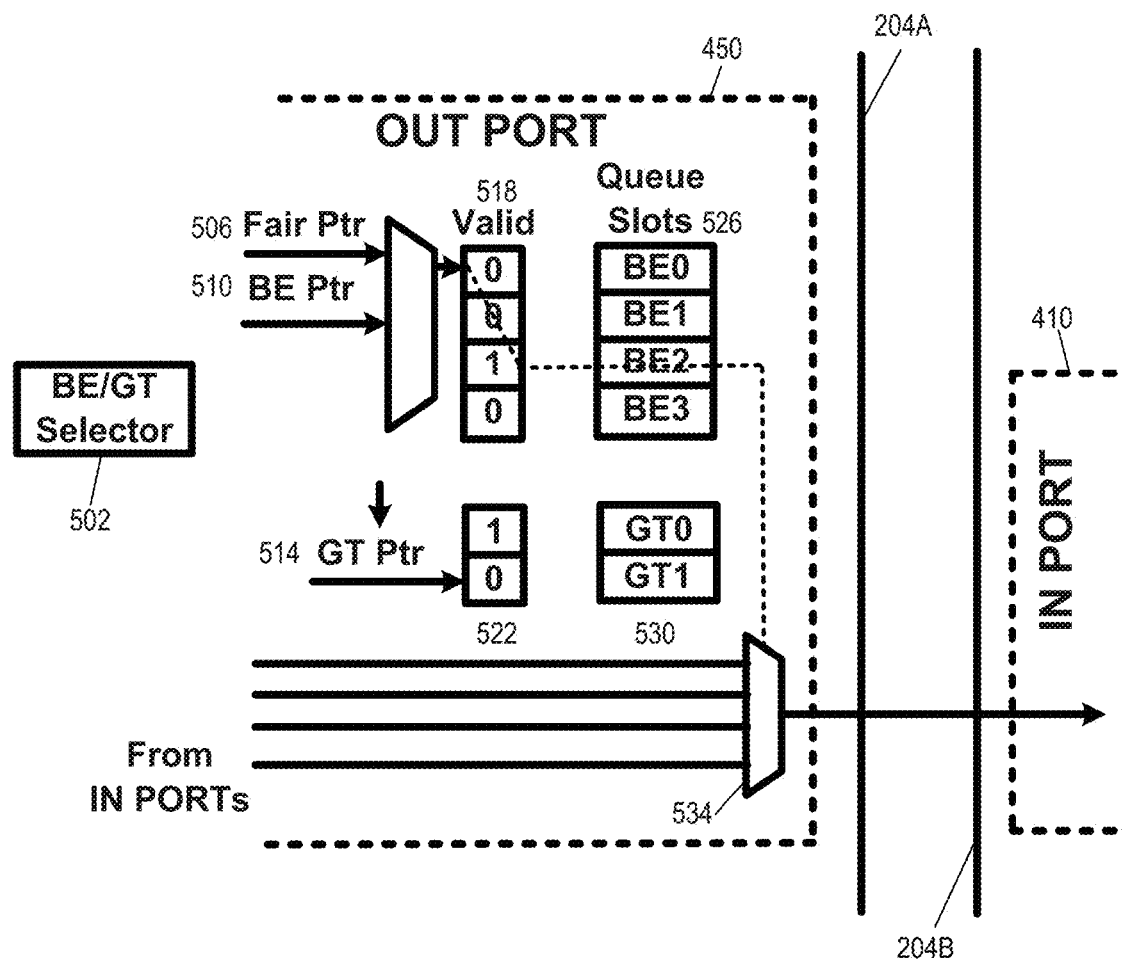
FIG. 5 illustrates an example portion of an OUT port of an NoC router that performs combined guaranteed throughput and best effort data transmissions in accordance with certain embodiments.

FIG. 5 illustrates an example portion of an OUT port 450 of an NoC router 204A that performs combined GT+BE data transmissions in accordance with certain embodiments. In the embodiment depicted, OUT port 450 comprises a BE/GT Selector 502, fair pointer 506, BE pointer 510, GT pointer 514, BE valid register file 518, GT valid register file 522, BE queue slot register file 526, GT queue slot register file 530, and multiplexer logic 534.

Request packets 304 may reserve time slots on the channel by storing a valid bit and direction in the corresponding queue slot in each router port. GT+BE transfers are achieved by differentiating time slots on the circuit-switched data channel. Queue slots are dedicated for either BE or GT traffic, with source cores controlling traffic type and assigning queue slots to schedule data transfers. The GT channels ensure minimum bandwidth requirements are met for producer/consumer workloads. Moreover, circuit-switching data transfers use end-to-end channel reservation to provide a guaranteed fixed and low latency for GT transfers.

When a reservation request packet 304 is received at the OUT port, information associated with the request packet (e.g., direction information specifying which IN port the request packet was received from) may be stored in the queue slots of the OUT port. In particular embodiments, each queue slot of BE queue slot register file 526 and GT queue slot register file 530 corresponds to a unique identifier. A request packet 304 may indicate whether the associated data transfer is a BE transfer or a GT transfer by specifying an identifier of a queue slot that is either in the BE queue slot register file 526 or the GT queue slot register file 530. In alternative embodiments, the request packet 304 may include a bit that specifies whether the transfer is a GT transfer or a BE transfer in addition to a queue slot identifier. BE/GT selector 502 operates to control a ratio of BE transfers to GT transfers.

Each time the OUT port 450 is free to transfer data, BE/GT selector 502 specifies whether a BE transfer or a GT transfer should occur. The BE/GT selector 502 may specify any suitable ratio between BE transfers and GT transfers. For example, the BE/GT selector 502 may specify that one GT transfer should occur for every two BE transfers. In various embodiments, the ratio of the BE/GT selector 502 is programmable. In some embodiments, the NoC includes control logic to set the ratio based on monitored traffic patterns in the router and/or the NoC. In an embodiment, the same ratio is used by the BE/GT selectors 502 of all of the routers of the NoC.

When a BE transfer is selected, the BE valid register file 518 is checked to see if the entry indicated by the BE pointer 510 indicates that the corresponding queue slot of BE queue slot register file 526 is valid. If the BE valid register file 518 indicates that the entry is invalid, each entry is checked in turn until a valid entry is found. The information (e.g., direction information) in the corresponding queue slot of BE queue slot register file 526 is used to control multiplexer logic 534. Multiplexer logic 534 may represent logic that is suitable to pass control and/or data signals. For example, multiplexer logic 534 may receive an acknowledgement signal and circuit-switched data from each IN port of router 204A and select one set of signals to be sent to a corresponding IN port 410 of a different router 204B (which may have any of the characteristics of router 204A). The BE pointer 510 may be incremented at the end of each BE transfer. The BE queue slot used to control multiplexer logic 534 may be automatically cleared (e.g., the slot may be cleared once it is selected and the port has received acknowledge signals from the source and destination) to allow subsequent BE traffic to proceed.

When a GT transfer is selected, the GT valid register file 522 is checked to see if the entry indicated by the GT pointer 514 indicates that the corresponding queue slot of GT queue slot register file 530 is valid. If the GT valid register file 522 indicates that the entry is valid, the information (e.g., direction information) in the corresponding queue slot of GT queue slot register file 530 is used to control multiplexer logic 534. The GT pointer 514 may be incremented after each GT transfer. The GT queue slot used to control multiplexer logic 534 may require one or more explicit clear signals from the source and/or destination before the slot is cleared.

When the entry of the GT valid register file 522 indicated by the GT pointer 514 indicates that the corresponding queue slot is invalid, a GT transfer is not performed. Instead, the BE valid register file 518 is checked to see if the entry indicated by the fair pointer 506 indicates that the corresponding queue slot of BE queue slot register file 526 is valid. If the BE valid register file 518 indicates that the entry is invalid, each entry is checked in turn until a valid entry is found. For example, in the embodiment depicted, the fair pointer 506 points to the top slot of register 526. However, this slot (and the next slot) is indicated as being invalid. Accordingly, the BE2 slot of register file 526 is selected. The information (e.g., direction information) in this queue slot of BE queue slot register file 526 is then used to control multiplexer logic 534. The fair pointer 506 helps avoid favoring one or more of the queue slots of register 526 when one or more particular GT queue slots remains empty for an extended period of time. In various embodiments, the fair pointer 506 is optional.

The fair pointers 506, BE pointers 510, and GT pointers 514 in the various ports of the routers of the NoC may be globally synchronized with each other. That is, the fair pointers 506 may all point to the same BE queue slot of their respective BE queue slot register files, the BE pointers 510 may all point to the same BE queue slot of their respective BE queue slot register files, and the GT pointers 514 may all point to the same GT queue slot of their respective GT queue slot register files. These global pointers may provide round robin service for the queue slots.

The BE transfers may be said to be communicated according to a best effort communication scheme wherein no guarantees as to latency or throughput are provided. The GT transfers may be said to be communicated according to a guaranteed throughput communication scheme wherein a minimum throughput for the GT transfer is assured by the use of reserved resources for the GT transfer.

Figure 6:
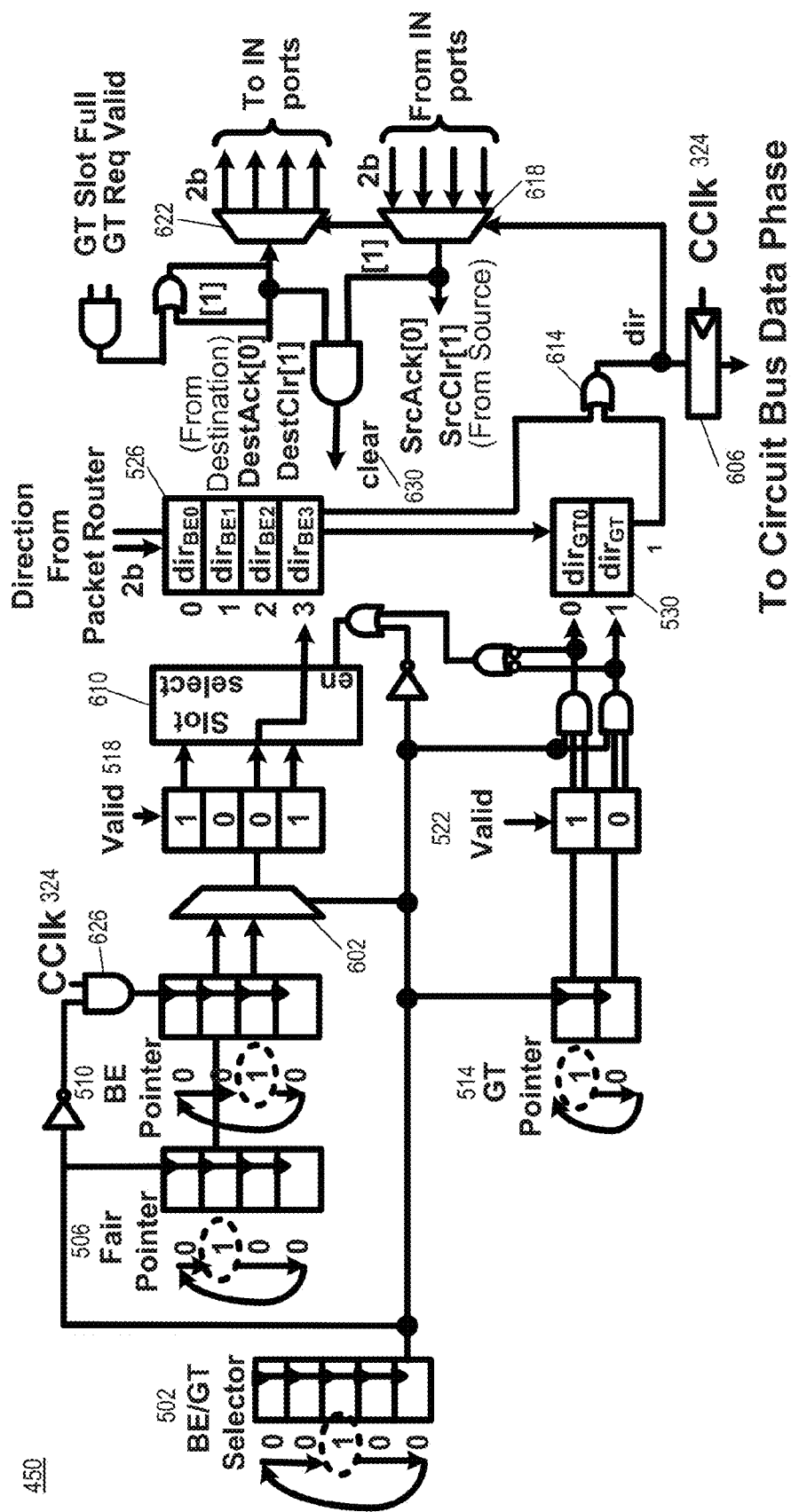
FIG. 6 illustrates another example portion of an OUT port of an NoC router that performs combined guaranteed throughput and best effort data transmissions in accordance with certain embodiments.

FIG. 6 illustrates another example portion of an OUT port 450 of an NoC router that performs combined GT+BE data transmissions in accordance with certain embodiments. In the embodiment depicted, BE/GT selector 502 and the pointers are implemented as shift register based counters. A "1" in a register of the BE/GT selector 502 indicates that a GT transfer should occur while a "0" indicates that a BE transfer should occur. Accordingly, a 4:1 BE/GT ratio is implemented in the illustration. The fair pointer 506 and the GT pointer 514 may be enabled by the BE/GT selector 502 and thus may be incremented each time a GT transfer is indicated by the output of the BE/GT selector. The inverted output of the BE/GT selector 502 is fed to an AND gate 626, which enables the BE pointer to be clocked by circuit clock 324. Thus, the BE pointer 510 is incremented each circuit clock cycle when a BE transfer is indicated by the BE/GT selector 502.

Multiplexer logic 602 selects either the fair pointer 506 or the BE pointer 510 based on whether the BE/GT selector 502 indicates a GT transfer or a BE transfer. The slot select logic 610 determines, starting from the relevant pointer location, the next valid queue slot of register file 526 and selects this queue slot if the en input signal is active (indicating either that a selected GT queue slot is not valid or that the BE/GT selector 502 has indicated that a BE transfer is to take place). If the BE/GT selector indicates a GT transfer, and the GT pointer selects a valid GT queue slot, a GT transfer is to occur.

Direction information from the selected queue slot is passed through OR gate 614 to configure multiplexing logic 618 and demultiplexing logic 622 to pass acknowledge signals. During each time slot, these Src Ack and Dest Ack signals attempt to traverse the network in the forward and reverse directions, respectively. The presence of both acknowledges at any core or router indicates a complete channel from source to destination. This event initiates a circuit-switched data transfer along the channel during the next clock cycle. Accordingly, the direction information is delayed through a flip flop 606 before being passed to control logic for configuring the direction of the circuit-switched channel.

Acknowledge signals received may act to clear queue slots. The clear signal 630 becomes active when DestAck (an acknowledge signal from the destination) and SrcAck (an acknowledge signal from the source) have been received. In response to a BE transfer, the clear signal 630 may clear the BE queue slot currently being used to transfer data. A separate SrcClr signal from the source core maybe be used to clear a GT queue slot. The core sending the circuit-switched data may keep track of how long each circuit transfer stream is and on the last transfer may send a SrcClr signal instead of the SrcAck signal.

Figure 7:
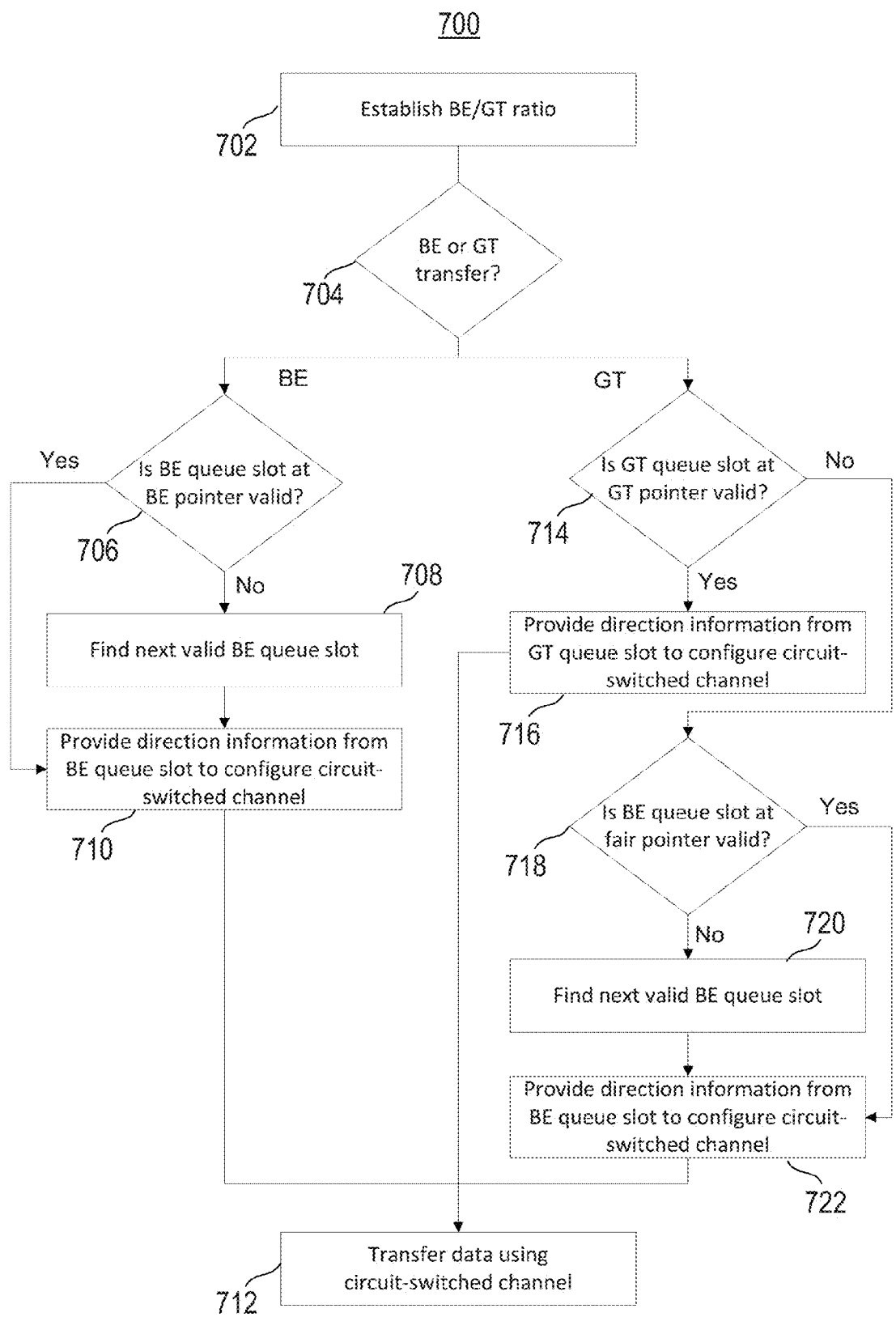
FIG. 7 illustrates an example method for performing combined guaranteed throughput and best effort data transmissions in accordance with certain embodiments.

FIG. 7 illustrates an example method for performing combined GT+BE data transmissions in accordance with certain embodiments. At step 702, a BE/GT ratio is established. This ratio defines how many BE transfers will be performed by a port of a router for every GT transfer performed by the port. The BE/GT ratio may be established in any suitable manner. In one embodiment, bits corresponding to GT transfers may be set high in a storage element while bits corresponding to BE transfers are set low (or vice versa).

At step 704, it is determined whether the next transfer should be a BE transfer or a GT transfer. This may be determined in any suitable manner. For example, a bit in a location of the storage element (mentioned above) indicated by a pointer associated with the storage element may be read and if the resulting bit is high, it is determined that a GT transfer is to be performed and if the bit is low it is determined that a BE transfer is to be performed (or vice versa).

If it is determined at step 704 that a BE transfer is to be performed, it is determined whether a BE queue slot at a location indicated by a BE pointer is valid. For example, the queue slot may be associated with a bit that indicates whether the queue slot is valid. If the queue slot is valid, the method moves to step 710. If the queue slot is not valid, the next valid BE queue slot is found at step 708. At step 710, direction information from the BE queue slot is provided to configure a circuit-switched channel. Such configuration may involve configuring multiplexing logic or demultiplexing logic for control and/or data signals. At step 712, data is transferred using the established circuit-switched channel. Though not shown, the method may return to step 704 after step 712.

If it is determined at step 704 that the transfer is to be a GT transfer, it is determined whether the GT queue slot at a location indicated by a GT pointer is valid at step 714. If the GT queue slot is valid, direction information from the GT queue slot is provided to configure a circuit-switched channel at step 716 and data is transferred using the circuit-switched channel at step 712. If the GT queue slot is not valid, it may be determined whether a BE queue slot at a location indicated by a fair pointer is valid at step 718. If the BE queue slot is not valid, the next valid BE queue slot is found at step 720. At step 722, direction information from the BE queue slot is provided to configure a circuit-switched channel and data is transferred using the circuit-switched channel at step 712.

Some of the steps illustrated in FIG. 7 may be repeated, combined, modified or deleted where appropriate, and additional steps may also be added to the flowchart. Additionally, steps may be performed in any suitable order without departing from the scope of particular embodiments.

Figure 8:
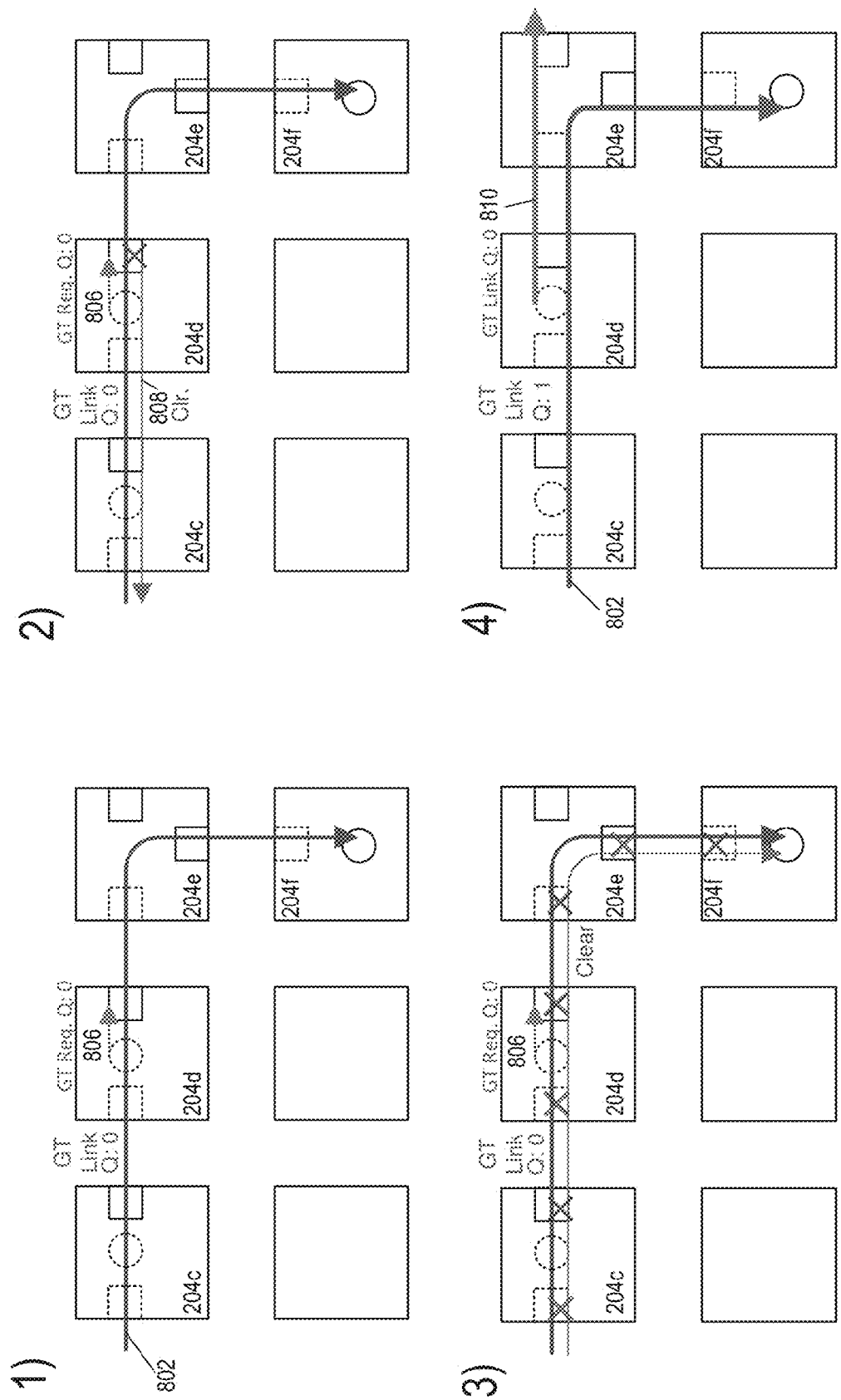
FIG. 8 illustrates an example communication flow for performing dynamic slot reallocation in a combined guaranteed throughput and best effort NoC in accordance with certain embodiments.

FIG. 8 illustrates an example communication flow for performing dynamic slot reallocation (DSR) in a combined GT+BE NoC in accordance with certain embodiments. DSR resolves collisions in GT resources. Since control of GT queue slot selection is distributed in the cores, cores may simultaneously request the same channel resources. In addition, since GT resources are reserved for an arbitrarily long amount of time, without additional techniques, resource conflicts may result in intolerably long channel setup delays or network deadlock. Some solutions may rely on users to avoid GT conflicts. However, this technique is labor intensive, restricted to a particular NoC architecture, and requires global knowledge of NoC applications. This prevents applications from being ported from one NoC to another with different topology or number of queue slots. It also precludes privacy between applications, for example in an NoC running multiple virtual machines.

DSR exhaustively searches for a solution where all GT requests are granted. In this manner, it finds a solution as long as GT bandwidth is not exceeded in any link within the network. When a core requests a GT channel that is already held, the previous owner cedes control to the new request and retries in a different time slot. This prevents any sub-optimally assigned GT transfer from creating deadlock. For example, if a first GT transfer has reserved a GT queue slot of a port and the port receives another GT request for that slot, the reservation for the first GT transfer is removed from the GT queue slot and the second GT request is placed in the queue slot. The source of the first GT transfer is notified and the first GT transfer may try again to reserve a GT queue slot (at a later time and/or on a different GT queue slot).

In the embodiment depicted, at block 1, a first GT transfer 802 between routers 204C and 204f is occurring. The first GT transfer 802 occupies a GT queue slot 0 in each of the routers along the path. A GT reservation request 806 for GT queue slot 0 collides with the existing channel servicing GT transfer 802. Without DSR, request 806 might never be granted, and could create deadlock. At block 2, a clear signal 808 (e.g., a DestClr signal) is sent from the point of conflict to the source core of GT transfer 802, instructing the source to finish up the transfer. The source core may use a predetermined timeout period to resolve dependencies on the GT channel. At block 3, the source core sends a clear signal (e.g., a SrcClr signal) to all routers on the channel that results in the tearing down of the link at each router. At block 4, the GT transfer 802 is retried on GT queue slot 1 and a circuit-switched channel is successfully established for the GT transfer 802. The GT reservation request stores data in GT queue slot 0 and a GT transfer 810 associated with the GT reservation request is established using GT queue slot 0.

Figure 9:
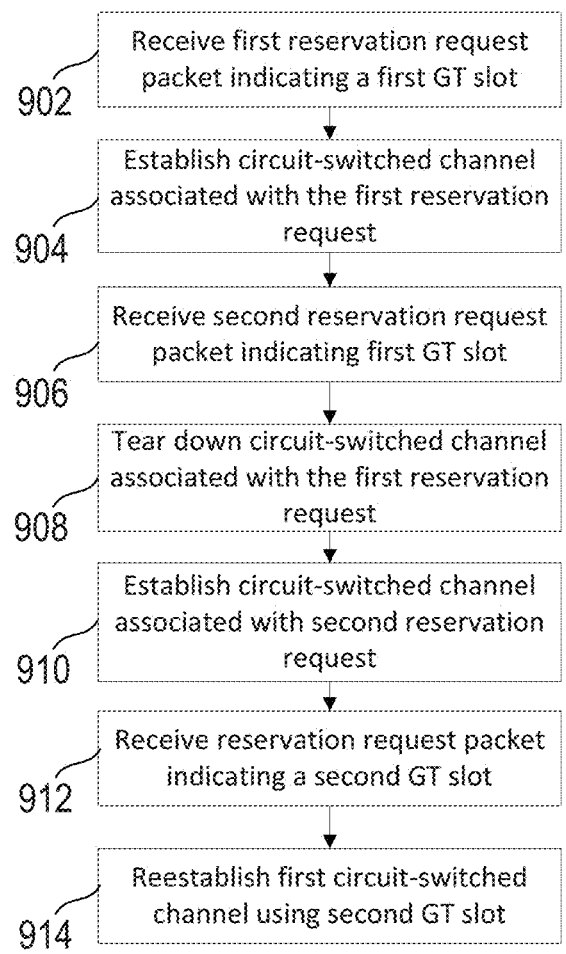
FIG. 9 illustrates an example method for performing dynamic slot reallocation in a combined guaranteed throughput and best effort NoC in accordance with certain embodiments.

FIG. 9 illustrates an example method for performing DSR in a combined GT+BE NoC in accordance with certain embodiments. At step 902, a first reservation request packet indicating a first GT queue slot is received. Direction information associated with the first reservation packet may be stored in the first GT queue slot. At step 904, a circuit-switched channel associated with the first reservation packet is established. The circuit-switched channel may be established using direction information stored in the first GT queue slot.

At step 906, a second reservation request packet indicating the first GT queue slot is received. The reservation request packet may be associated with a GT transfer that is different from the GT transfer associated with the first reservation request packet received. The GT transfers may or may not have different sources and/or destinations. At step 906, the circuit-switched channel associated with the first reservation request is torn down. This may involve sending one or more clear signals to routers along the path from source to destination of the GT transfer associated with the circuit-switched channel.

At step 910 a circuit-switched channel associated with the second reservation request is established. This channel may be established using direction information from the second reservation request that has been stored in the first GT queue slot in place of the information previously stored there for the first reservation request.

At step 912 a reservation request packet indicating a second GT queue slot is received. This reservation request packet may be associated with the same GT transfer that was associated with the first reservation request packet. Direction information from this request packet may be written to the second GT queue slot. At step 914, the first circuit-switched channel is reestablished using, among other information, the direction information from the second GT slot.

Some of the steps illustrated in FIG. 9 may be repeated, combined, modified or deleted where appropriate, and additional steps may also be added to the flowchart. Additionally, steps may be performed in any suitable order without departing from the scope of particular embodiments.

In various embodiments, total network throughput may be maximized with 4 BE queue slots and 4 GT queue slots. Using fewer GT slots may provide fewer GT channels than requested by the processing elements. Increasing the number of GT slots increases traffic flexibility, but increases hardware requirements and allocates less bandwidth to each transfer by dividing total GT bandwidth among a greater number of slots.

Figure 10:
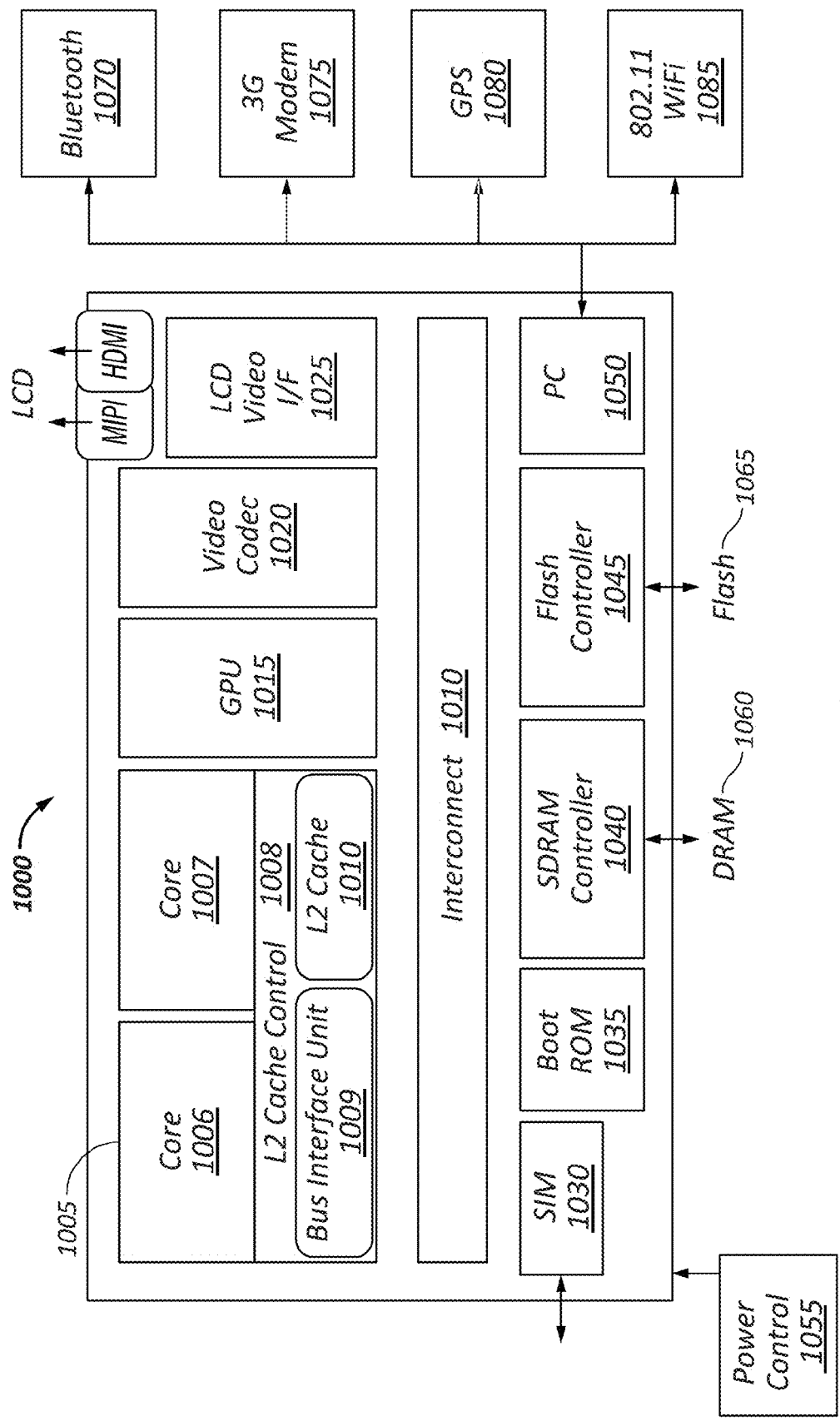
FIG. 10 illustrates another block diagram for an example computing system in accordance with certain embodiments.

FIG. 10 illustrates another embodiment of a block diagram for an example computing system in accordance with one embodiment. In this figure, an embodiment of a system on-chip (SOC) design in accordance with the disclosures is depicted. As a specific illustrative example, SOC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Similar to the discussion above, cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1010 includes an on-chip interconnect, such as an IOSF, AMBA, or other interconnect discussed above, which potentially implements one or more aspects of the described disclosure.

Interface 1010 provides communication channels to the other components, such as a Subscriber Identity Module (SIM) 1030 to interface with a SIM card, a boot rom 1035 to hold boot code for execution by cores 1006 and 1007 to initialize and boot SOC 1000, a SDRAM controller 1040 to interface with external memory (e.g. DRAM 1060), a flash controller 1045 to interface with non-volatile memory (e.g. Flash 1065), a peripheral control Q1650 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein.

In addition, the system illustrates peripherals for communication, such as a Bluetooth module 1070, 3G modem 1075, GPS 1085, and WiFi 1085. Note as stated above, a UE includes a radio for communication. As a result, these peripheral communication modules are not all required. However, in a UE some form a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic (e.g., a router of a network-on-chip), a method, and a non-transitory machine readable medium (including information to represent structures, when manufactured, to be configured) to comprise a port to receive a plurality of reservation request packets; at least one guaranteed throughput queue slot and at least one best effort queue slot, a queue slot to store information associated with a reservation request packet of the plurality of reservation request packets; a selector to select between the at least one guaranteed throughput queue slot and the at least one best effort queue slot based on a ratio; and channel configuration logic to establish a circuit-switched channel based on information stored in a queue slot that is to be identified in accordance with the selection of the selector.

In at least one example, the router is to provide a guaranteed throughput for a circuit-switched data transfer associated with information stored in a guaranteed throughput queue slot.

In at least one example, the router is to provide a best effort delivery for a circuit-switched data transfer associated with information stored in a best effort queue slot.

In at least one example, a reservation request packet of the plurality of reservation request packets is to identify a queue slot of the at least one guaranteed throughput queue slot or the at least one best effort queue slot, wherein information associated with the reservation request packet is to be stored in the identified queue slot.

In at least one example, the information associated with a reservation request packet comprises direction information identifying a different port of the router.

In at least one example, the router is further to comprise logic to determine that a reservation request packet of the plurality of reservation request packets identifies a best effort queue slot that is occupied and delay the processing of the reservation request packet.

In at least one example, the router is further to comprise logic to determine that a first reservation request packet of the plurality of reservation request packets identifies a first guaranteed throughput queue slot that is occupied with information associated with a second reservation request packet of the plurality of reservation request packets and overwrite the information in the first guaranteed throughput queue slot with information associated with the first reservation request packet.

In at least one example, the logic is further to send a clear signal to a source of a circuit-switched transfer associated with the second reservation request packet.

In at least one example, the port is to receive a reservation request packet to originate from the source, the reservation request packet to be sent in response to the clear signal, the reservation request packet identifying a different guaranteed throughput queue slot of the at least one guaranteed throughput queue slot.

In at least one example, a circuit-switched channel based on information stored in a guaranteed throughput queue slot and a circuit-switched channel based on information stored in a best effort queue slot are to send data over the same link of the router at different times.

In at least one example, the selector comprises a shift register with an output that is to indicate whether a queue slot of the at least one guaranteed throughput queue slot or a queue slot of the at least one best effort queue slot is to be used to establish the circuit-switched channel.

In at least one example, a best effort queue slot is to be used to establish a circuit-switched channel when a guaranteed throughput queue slot identified in accordance with the selection of the selector is not valid.

One or more embodiments may provide an apparatus, a system, a machine readable storage, a machine readable medium, hardware- and/or software-based logic (e.g., a router port), a method, and a non-transitory machine readable medium (including information to represent structures, when manufactured, to be configured) to receive a first packet-switched reservation request, communicate data associated with the first packet-switched reservation request through a first circuit-switched channel according to a best effort communication scheme, receive a second packet-switched reservation request; and communicate data associated with the second packet-switched reservation request through a second circuit-switched channel according to a guaranteed throughput communication scheme.

In at least one example, the router port is to further communicate the data associated with the first packet-switched reservation request and the data associated with the second packet-switched reservation request at different times using the same link of the router port.

In at least one example, the router port is to further select between a best effort data transfer and a guaranteed throughput data transfer based on a ratio stored by the router port.

In at least one example, the router port is to further terminate a data transfer associated with the second packet-switched reservation request when a third packet-switched reservation request is received, the third packet-switched reservation request to request a guaranteed throughput transfer that is to use at least one resource used by the data transfer associated with the second packet-switched reservation request.

One or more embodiments may provide an apparatus, a system, a machine readable storage, a machine readable medium, hardware- and/or software-based logic (e.g., a router port), a method, and a non-transitory machine readable medium (including information to represent structures, when manufactured, to be configured) to comprise a plurality of cores each associated with a router of a network on a chip. A router is to comprise a plurality of port sets. A port set is to comprise an output port. An output port is to comprise logic to receive a plurality of reservation request packets, at least one guaranteed throughput queue slot and at least one best effort queue slot, a queue slot to store information associated with a reservation request packet of the plurality of reservation request packets, a selector to select between the at least one guaranteed throughput queue slot and the at least one best effort queue slot based on a ratio that is common among the selectors of the network on a chip, and channel configuration logic to establish a circuit-switched channel based on information stored in a queue slot that is to be identified in accordance with the selection of the selector.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a router of a network-on-chip, the router comprising:
   a port to receive a plurality of reservation request packets;
   at least one guaranteed throughput queue slot and at least one best effort queue slot, a guaranteed throughput queue slot to store information associated with a reservation request packet for a guaranteed throughput transfer, a best effort queue slot to store information associated with a reservation request packet for a best effort transfer;
   a selector to select between the at least one guaranteed throughput queue slot and the at least one best effort queue slot based on a ratio that defines the number of best effort transfers to guaranteed throughput transfers; and
   channel configuration logic to establish a circuit-switched channel based on information stored in a queue slot that is to be identified in accordance with the selection of the selector.

2. The processor of claim 1, wherein the router is to provide a guaranteed throughput for a circuit-switched data transfer associated with information stored in a guaranteed throughput queue slot.

3. The processor of claim 1, wherein the router is to provide a best effort delivery for a circuit-switched data transfer associated with information stored in a best effort queue slot.

4. The processor of claim 1, wherein a reservation request packet of the plurality of reservation request packets is to identify a queue slot of the at least one guaranteed throughput queue slot or the at least one best effort queue slot, wherein information associated with the reservation request packet is to be stored in the identified queue slot.

5. The processor of claim 1, wherein the information associated with a reservation request packet comprises direction information identifying a different port of the router.

6. The processor of claim 1, wherein the router further comprises logic to:
   determine that a reservation request packet of the plurality of reservation request packets identifies a best effort queue slot that is occupied; and
   delay the processing of the reservation request packet.

7. The processor of claim 1, wherein the router further comprises logic to:
   determine that a first reservation request packet of the plurality of reservation request packets identifies a first guaranteed throughput queue slot that is occupied with information associated with a second reservation request packet of the plurality of reservation request packets; and
   overwrite the information in the first guaranteed throughput queue slot with information associated with the first reservation request packet.

8. The processor of claim 7, wherein the logic is further to send a clear signal to a source of a circuit-switched transfer associated with the second reservation request packet.

9. The processor of claim 8, wherein the port is to receive a reservation request packet to originate from the source, the reservation request packet to be sent in response to the clear signal, the reservation request packet identifying a different guaranteed throughput queue slot of the at least one guaranteed throughput queue slot.

10. The processor of claim 1, wherein a circuit-switched channel based on information stored in a guaranteed throughput queue slot and a circuit-switched channel based on information stored in a best effort queue slot are to send data over the same link of the router at different times.

11. The processor of claim 1, wherein the selector comprises a shift register with an output that is to indicate whether a queue slot of the at least one guaranteed throughput queue slot or a queue slot of the at least one best effort queue slot is to be used to establish the circuit-switched channel.

12. The processor of claim 1, wherein a best effort queue slot is to be used to establish a circuit-switched channel when a guaranteed throughput queue slot identified in accordance with the selection of the selector is not valid.

13. An apparatus comprising:
   a router port to:
   receive a first packet-switched reservation request indicating a best effort transfer;

communicate data associated with the first packet-switched reservation request through a first circuit-switched channel according to a best effort communication scheme;

receive a second packet-switched reservation request indicating a guaranteed throughput transfer;

communicate data associated with the second packet-switched reservation request through a second circuit-switched channel according to a guaranteed throughput communication scheme; and terminate a data transfer associated with the second packet-switched reservation request when a third packet-switched reservation request is received, the third packet-switched reservation request to request a guaranteed throughput transfer that is to use at least one resource used by the data transfer associated with the second packet-switched reservation request.

14. The apparatus of claim 13, the router port to further communicate the data associated with the first packet-switched reservation request and the data associated with the second packet-switched reservation request at different times using the same link of the router port.

15. The apparatus of claim 13, the router port to further select between a best effort data transfer and a guaranteed throughput data transfer based on a ratio stored by the router port.

16. A non-transitory machine readable medium including information to represent structures, when manufactured, to be configured to:

receive a first packet-switched reservation request indicating a best effort transfer;

communicate data associated with the first packet-switched reservation request through a first circuit-switched channel according to a best effort communication scheme;

receive a second packet-switched reservation request indicating a guaranteed throughput transfer;

communicate data associated with the second packet-switched reservation request through a second circuit-switched channel according to a guaranteed throughput communication scheme; and terminate a data transfer associated with the second packet-switched reservation request when a third packet-switched reservation request is received, the third packet-switched reservation request to request a guaranteed throughput transfer that is to use at least one resource used by the data transfer associated with the second packet-switched reservation request.

17. The medium of claim 16, the structures, when manufactured, to be further configured to communicate the data associated with the first packet-switched reservation request and the data associated with the second packet-switched reservation request at different times using the same link of a router port.

18. The medium of claim 16, the structures, when manufactured, to be further configured to select between a best effort data transfer and a guaranteed throughput data transfer based on a ratio stored by a router port.

19. A system comprising:

a plurality of cores each associated with a router of a network on a chip, a router comprising:

a plurality of port sets, a port set to comprise an output port to comprise:

logic to receive a plurality of reservation request packets;

at least one guaranteed throughput queue slot and at least one best effort queue slot, a guaranteed throughput queue slot to store information associated with a reservation request packet for a guaranteed throughput transfer, a best effort queue slot to store information associated with a reservation request packet for a best effort transfer;

a selector to select between the at least one guaranteed throughput queue slot and the at least one best effort queue slot based on a ratio that defines the number of best effort transfers to guaranteed throughput transfers wherein the ratio is common among the selectors of the network on a chip; and channel configuration logic to establish a circuit-switched channel based on information stored in a queue slot that is to be identified in accordance with the selection of the selector.

* * * * *